(No Model.)
F. W. GAY.
TWO WHEELED VEHICLE.
No. 386,311. Patented July 17, 1888.
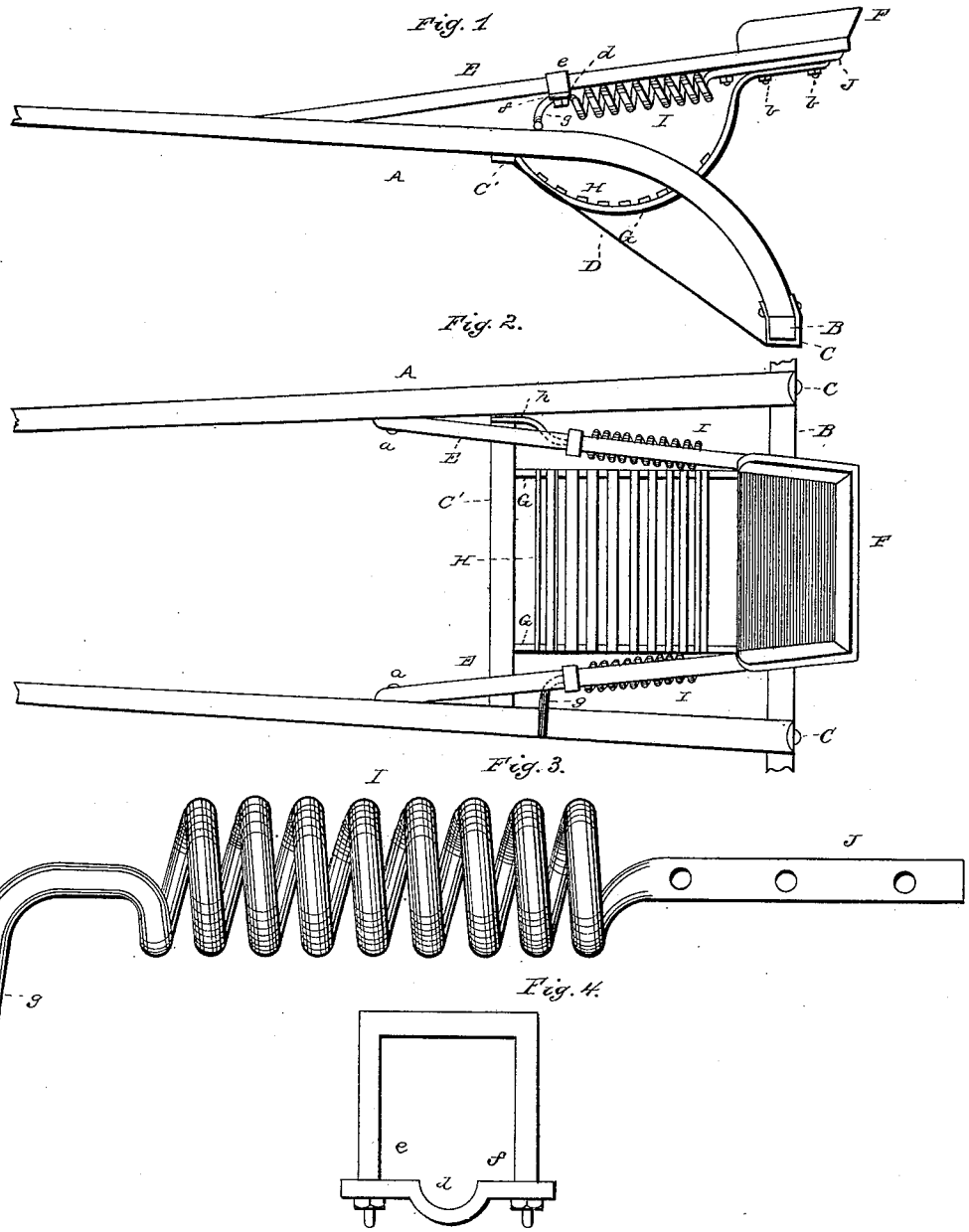

UNITED STATES PATENT OFFICE.

FREDERICK W. GAY, OF OTTAWA, ILLINOIS.

TWO-WHEELED VEHICLE.

SPECIFICATION forming part of Letters Patent No. 386,311, dated July 17, 1888.

Application filed February 25, 1888. Serial No. 265,268. (No model.)

*To all whom it may concern:*

Be it known that I, FREDERICK W. GAY, a citizen of the United States, and a resident of Ottawa, in the county of La Salle and State of Illinois, have invented certain new and useful Improvements in Two-Wheeled Vehicles; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side elevation of my improved spring attached to a vehicle. Fig. 2 is a plan or top view of a vehicle with my improved spring attached. Fig. 3 is a top view of my improved spring. Fig. 4 is an end view of clip and tie.

The invention relates to improvements in two-wheeled vehicles; and it consists in the construction and novel combination of parts, as hereinafter set forth.

Referring to the drawings, A designates the thills secured to the axle B by clips C. C' is the cross-bar bolted to the thills, as shown, and D represents iron brace-rods secured at one end at the junction of the thills and cross-bar and to the axle at the other end.

The converging arms E are bolted to the thills at $a$, and extend rearwardly to form supports for the seat F, and curved bars G are bolted to the outer ends of the arms E and to the cross-bar C'. Transverse foot-rest slats H are attached at their ends to the curved bars G.

I I designate spiral springs, preferably of round iron, having the straight flat portion J rigidly secured to the under side of the arms E by bolts $b$, and the opposite end portions, $c$, passing loosely through the space $d$ between the clip-tie $e$ and the arm, the tie $e$ being secured in place by the clip $f$. The spring portion $g$ is turned from the clip-tie downward and outward and rests upon the upper side of the thills; or the portion $g$ may be extended forward, as at $h$, Fig. 2, and rest its end upon the cross-bar C'.

It will be observed that the clip-tie $e$ forms a journal-bearing, and that the portion $c$ of the spring turns therein. By this construction a direct and spiral spring is combined and act together. If desired, a metal bearing-plate may be secured to the thills or cross-bar beneath the spring end to protect the wood.

Having described my invention, what I claim is—

1. In a two-wheeled vehicle, the combination, with the thills and the axle, of the converging seat-arms secured to the thills, and the springs having the spiral portion, the flattened portion, and the downwardly and outwardly bent portion, substantially as specified.

2. In a two-wheeled vehicle, the combination, with the thills and the axle, of the converging seat-arms, the spiral spring having the flattened portion secured to the arms, and the opposite downwardly and outwardly bent portions secured by clip-ties, the outer ends of said springs resting on the thills or cross-bar, substantially as specified.

3. In a two-wheeled vehicle, the combination of the thills A, the axle B, the cross-bar bolted to the thills, the iron brace-rods D, the converging arms E, bolted to the thills at $a$, forming a support for the seat, the curved bars G, the transverse slats, and the spiral springs I, having the portion J rigidly attached to the under side of the arms E, and the opposite end portions, $c$, passing through the space $d$, and having the downwardly and outwardly turned portions, the clips, and the clip-tie, substantially as specified.

In testimony whereof I affix my signature in presence of two witnesses.

FREDERICK W. GAY.

Witnesses:
JOHN C. McKEON,
PHILO M. LINDLEY.